United States Patent Office 3,632,596
Patented Jan. 4, 1972

3,632,596
ALUMINUM CHLORHYDROXY ALLANTOIN:
PROPYLENE GLYCOL COMPLEX
Sebastian B. Mecca, Abington, Pa., assignor to Schuylkill
Chemical Company, Philadelphia, Pa.
No Drawing. Filed Aug. 18, 1967, Ser. No. 661,518
Int. Cl. C07f 5/06
U.S. Cl. 260—299          6 Claims

ABSTRACT OF THE DISCLOSURE

An alcohol-soluble aluminum chlorhydroxy allantoin: propylene glycol complex is provided by reacting allantoin with a propylene glycol complex of aluminum chlorhydroxide.

---

The present invention relates to a novel chemical compound of allantoin and to its preparation; and, more particularly, the present invention relates to a complex of aluminum chlorhydroxy allantoinate and propylene glycol which has advantageous characteristics including enhanced solubility in organic liquids, especially alcohol, and in mixtures of water-soluble organic liquids and water.

Aluminum chlorhydroxide, $Al_2(OH)_5Cl$, has been widely used as an astringent in deodorant and antiperspirant products. More recently there has become available an alcohol-soluble propylene glycol complex of aluminum chlorhydroxide for use in deodorant and antiperspirant products (see, for example, Canadian Pat. No. 718,932). Allantoin, on the other hand, is known to possess a soothing, pain-relieving action as well as healing properties due to its marked cell-proliferating activity. Aluminum chlorhydroxy allantoinate, a complex salt of aluminum chlorhydroxide and allantoin, possess the soothing and healing properties of allantoin and the astringent properties of aluminum salts (U.S. Pat. No. 2,761,867). Aluminum chlorhydroxy allantoinate, however, has a solubility in water, at 25° C., of 1.7% and a solubility, at 25° C., in 95% ethyl alcohol of only 0.1%. Hence, its use has been limited to aqueous preparations since its low solubility in alcohol prevented its use in, for example, preshave lotions, skin cleaning lotions and aerosols based thereon.

It is the principal object of the present invention to provide a novel compound containing aluminum chlorhydroxide and allantoin which has advantageous characteristics, particularly enhanced solubility, as well as the known characteristics of aluminum chlorhydroxy allantoinate referred to above.

Another principal object of the present invention is to provide a simple method for preparing the novel compound.

Other objects will become apparent from a consideration of the following specification and claims.

The novel compound of the present invention is a complex of propylene glycol and aluminum chlorhydroxy allantoinate, and may be depicted as having the formula:

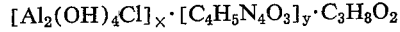

where $x$ is from about 1 to about 5 and $y$ is from about 0.02 to about 3, these figures referring to the number of mols. In the foregoing formula, $C_4H_5N_4O_3$ represents allantoin and $C_3H_8O_2$ represents propylene glycol.

The complex is prepared by heating, to a temperature of at least 50° C., a mixture of allantoin and a propylene glycol complex of aluminum chlorhydroxide in the presence of water.

As seen from the foregoing formula, the relative proportions of aluminum chlorhydroxide, allantoin and propylene glycol may vary somewhat. Regardless of the proportions, however, the product is a complex chemical compound in which the three components are chemically bound. This is shown by the enhanced solubility of the product as a whole as compared to that of a mixture prepared simply by mixing, dry and at room temperature, allantoin and the propylene glycol complex of aluminum chlorhydroxide, or of a mixture prepared by mixing aluminum chlorhydroxide allantoinate and propylene glycol— even in the presence of water—which mixtures exhibit the individual solubilities of the stated respective components. The solubility characteristics of the complex of the present invention vary depending upon the relative proportion of allantoin therein. For example, where allantoin makes up only about 1–2%, by weight, of the complex ($x$ is about 1 and $y$ is about 0.02 in the foregoing formula), the solubility of the complex in various materials at 25° C., is as follows: 75% in water; 50% in 95% ethyl alcohol; from 50 to 75% in mixtures of water and 95% ethyl alcohol depending upon the proportion of water; 65% in methanol, and 50% in glycerine. On the other hand, where allantoin makes up about 32% of the complex ($x$ is about 1 and $y$ is about 1 in the foregoing formula) the solubility characteristics of the complex, at 25° C., are as follows; 6% in water; 1.2% in 95% ethyl alcohol, and 2% in a mixture of 60% ethyl alcohol and 40% water.

In the complex of the present invention, the aluminum chlorhydroxide and the propylene glycol are preferably in a mol ratio of about 1 to 1. In the preferred complex, the allantoin is also present in the proportion of about 1 mol thereof per mol of propylene glycol. Thus, in the preferred complex of the invention $x$ is about 1 and $y$ is about 1 in the foregoing formula.

As stated, the present complex is prepared by reacting allantoin and propylene glycol complex of aluminum chlorhydroxide. The latter material is available commercially and is prepared, according to Canadian Pat. No. 718,932, by the removal of water, at an elevated temperature, from an aqueous mixture of aluminum chlorhydroxide and propylene glycol.

In reacting, according to the present invention, allantoin with the aluminum chlorhydroxide: propylene glycol complex, the two materials are mixed together with aqueous liquid in an amount at least sufficient to wet the materials. Hence, the reaction mixture may be in the form of a paste, slurry, or, upon heating, a solution. The aqueous liquid may be water itself or a mixture of water and a water-miscible organic liquid, like methanol, ethanol, glycerine, and the like. The initiation of the reaction requires water, and water in an amount of at least 10%, by weight, based on the total weight of the reactants will be present. The amount of water above this is not critical, as far as the reaction is concerned, and other factors, like size of equipment and the fact that the product may be dried, will normally limit the amount of aqueous liquid employed.

The reaction requires an elevated temperature. Thus, the reaction mixture will be heated to at least 50° C. The upper limit of temperature may be dictated by the boiling point of the aqueous medium, and, of course, decomposition of the product which occurs at temperatures above about 110° C. Thus, the temperature will be held below this and normally below 100° C. A particularly suitable temperature is from about 60 to about 75° C.

Preferably, water is removed from the product to a level below about 7%, by weight, based on the complex. In this connection, the aforementioned heating is advantageously continued until the product is dry and has reached a constant weight. The dry complex is a white powder. Continued heating may result in yellowing, hence heating should be discontinued before discoloration appears. Any one of a wide variety of batch-type and continuous drying means, including spray drying, may be employed, and vacuum may be employed to assist drying.

The following examples illustrate the preparation of typical complexes of the present invention and are not intended to limit the scope of the invention in any way.

EXAMPLE 1

Eighty grams of aluminum chlorhydroxide: propylene glycol complex (mol ratio 1:1) are thoroughly mixed with 40 gm. of allantoin. Fifteen cc. of boiling distilled water are then added to the mixture and mixed in until a damp mass is formed. The mass is then dried for 6 hours at 65–70° C. to a white powder. The product is a propylene glycol complex of aluminum chlorhydroxy allantoinate having the formula $$[Al_2(OH)_4Cl]_x \cdot [C_4H_5N_4O_3]_y \cdot C_3H_8O_2$$

where $x$ and $y$ are each about 1. At 25° C. its solubility characteristics are: 6% in water; 2% in 60% ethyl alcohol-40% water, and 1.2% in 95% ethyl alcohol.

EXAMPLE 2

Eighty grams of aluminum chlorhydroxide: propylene glycol complex (mol ratio 1:1) are dissolved in 300 cc. of ethyl alcohol at room temperature. To this solution is added a slurry, at 90° C., of 40 gms. of allantoin in 100 cc. of distilled water. After the material is thoroughly mixed it is dried at 50–60° C. The product is similar to that of Example 1.

EXAMPLE 3

The procedure of Example 1 is followed using, however, 25 cc. of 75% ethyl alcohol at 60° C. in place of the 15 cc. of boiling water. The product is similar to that of Example 1.

EXAMPLE 4

Eighty grams of propylene glycol: aluminum chlorhydroxide complex (mol ratio 1:1) and 40 gms. of allantoin are added to 100 cc. of boiling 75% alcohol. The material is then evaporated to dryness at 40–50° C. to provide a product similar to that of Example 1.

EXAMPLE 5

Ninety-seven grams of propylene glycol: aluminum chlorhydroxide complex (mol ratio 1:1) are mixed with 3 gm. of allantoin. To the resulting mixture are added 15 cc. of boiling distilled water and the material is mixed to provide a damp mass. The mass is dried for 6 hours at 60–65° C. The product, as a white powder, has the formula as given above where $x$ is about 1 and $y$ is about 0.02. It has the following solubility characteristics at 25° C.: 75% in water; 50% in 95% ethyl alcohol; between 50 and 75% in ethyl alcohol-water mixtures depending upon the proportion of water; 65% in methanol, and 50% in glycerine.

EXAMPLE 6

Ninety-seven grams of propylene glycol: aluminum chlorhydroxide complex are dissolved in 200 cc. of 95% ethyl alcohol at 50° C. Three grams of allantoin are dissolved in 25 cc. of boiling distilled water and this solution is added to the first solution. After thorough mixing, and while stirring, the material is dried at 50–60° C. to provide a product similar to that of Example 5.

The complex of the present invention may be used in cosmetic compositions where the propylene glycol: aluminum chlorhydroxide complex is normally used, such as in preshave and aftershave lotions, skin lotions, body astringents, deodorant and antiperspirant products, hair lotions and related cosmetic and dermatological preparations based on alcohol and alcohol-water media. Since it is also compatible with halo-carbon propellants, it may be used in aerosol preparations.

I claim:

1. An aluminum chlorhydroxy allantoinate: propylene glycol complex.

2. The aluminum chlorhydroxy allantoinate: propylene glycol complex of claim 1 having the formula:

$$[Al_2(OH)_4Cl]_x \cdot [C_4H_5N_4O_3]_y \cdot C_3H_8O_2$$

where $x$ is from about 1 to about 5 and $y$ is from about 0.02 to about 3.

3. The aluminum chlorhydroxy allantoinate: propylene glycol complex of claim 2 wherein $x$ is about 1.

4. The aluminum chlorhydroxy allantoinate: propylene glycol complex of claim 2 wherein $y$ is about 1.

5. The aluminum chlorhydroxy allantoinate: propylene glycol complex of claim 4 wherein $x$ is about 1.

6. The complex of claim 1 in the form of a white powder.

References Cited

UNITED STATES PATENTS 2,761,867   9/1956   Mecca _____ 260—299
3,359,169   12/1967  Slater et al. _____ 424—68

ALTON D. ROLLINS, Primary Examiner

U.S. Cl. X.R.

414—47, 68, 71